(12) United States Patent
Rathakrishnan et al.

(10) Patent No.: US 7,433,886 B2
(45) Date of Patent: Oct. 7, 2008

(54) SQL LANGUAGE EXTENSIONS FOR MODIFYING COLLECTION-VALUED AND SCALAR VALUED COLUMNS IN A SINGLE STATEMENT

(75) Inventors: Balaji Rathakrishnan, Sammamish, WA (US); Stefano Stefani, Seattle, WA (US); Aleksandras Surna, Redmond, WA (US); Jose A. Blakeley, Bothell, WA (US); Oliver Nicholas Seeliger, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 10/693,302

(22) Filed: Oct. 24, 2003

(65) Prior Publication Data

US 2005/0091256 A1  Apr. 28, 2005

(51) Int. Cl.
  *G06F 17/30* (2006.01)
(52) U.S. Cl. .................... 707/103 R; 707/2; 707/1; 707/4
(58) Field of Classification Search ................. None
  See application file for complete search history.

(56) References Cited

U.S. PATENT DOCUMENTS

| | | | | |
|---|---|---|---|---|
| 5,412,804 | A | 5/1995 | Krishna | 395/600 |
| 6,016,497 | A * | 1/2000 | Suver | 707/103 R |
| 6,122,644 | A * | 9/2000 | Graefe et al. | 707/202 |
| 6,460,043 | B1 | 10/2002 | Tabbara et al. | 707/100 |
| 6,484,179 | B1 | 11/2002 | Roccaforte | 707/102 |
| 6,493,708 | B1 | 12/2002 | Ziauddin et al. | 707/3 |
| 6,564,203 | B1 * | 5/2003 | Krishnaprasad et al. | 707/2 |
| 6,636,870 | B2 | 10/2003 | Roccaforte | 707/109 |
| 6,892,204 | B2 * | 5/2005 | Haas et al. | 707/100 |
| 2004/0073565 | A1 * | 4/2004 | Kaufman et al. | 707/101 |

\* cited by examiner

*Primary Examiner*—Charles Rones
*Assistant Examiner*—Belix M Ortiz
(74) *Attorney, Agent, or Firm*—Woodcock Washburn LLP (57) ABSTRACT

A system and method for updating collection-valued and other complex structured columns in a nested table using a nested extension of an UPDATE statement that is analogous to the syntax and semantics of the UPDATE statement that is used to modify scalar-valued columns of the table (called the outer UPDATE). Using the same syntactic and semantic constructs as the table at the outer level allows an existing implementation that processes modifications to relational tables to reuse its implementation techniques for processing outer updates to modify collection-valued columns as well. The UPDATE extensions enable the specification of updates to nested collections embedded at arbitrary levels of depth in the object model. The new syntax is embedded inside the outer UPDATE statement in a way that parallels the structure of the data itself and thus maps more directly to the user's conceptual model of the data.

22 Claims, 6 Drawing Sheets

Employees

EmployeeID
FirstName
LastName
Salary
Addresses
  Street
  City
  State
  ZipCode
  PhoneNos
    AreaCode
    Number
    Extension

```
UPDATE Employees
SET    Salary = Salary * 1.1,
       (DELETE FROM Addresses
       WHERE City = 'Seattle')
WHERE EmpID = 1234 OR EmpID = 1235
```

| EmployeeID | FirstName | LastName | Salary | Addresses | |
|---|---|---|---|---|---|
| 1233 | John | Smith | 50000 | 30 Jump Street, Seattle, WA, 98000 | 206-123-45-60 |
| | | | | | 206-123-45-61 |
| 1234 | Tom | Brown | 60000 | 20 Jump Street, Portland, OR, 97000 | 207-123-45-67 |
| | | | | | 207-123-45-66 |
| | | | | 31 Pine Street, Seattle, WA, 98000 | 206-123-45-68 |
| | | | | | 208-123-45-69 |
| 1235 | Robert | White | 40000 | 32 Pine Street, Seattle, WA, 98000 | 206-123-45-79 |
| | | | | | 206-123-45-80 |
| | | | | 33 Pine Street, Seattle, WA, 98000 | 206-123-45-81 |

⬇ Gather delta stream

| Changed EmployeeID | New Salary | Change Descriptor For Addresses |
|---|---|---|
| 1234 | 66000 | Deleted Address |
| | | #2 |
| 1235 | 44000 | Deleted Address |
| | | #1 |
| | | #2 |

⬇ Apply changes

| EmployeeID | FirstName | LastName | Salary | Addresses | |
|---|---|---|---|---|---|
| 1233 | John | Smith | 50000 | 30 Jump Street, Seattle, WA, 98000 | 206-123-45-60 |
| | | | | | 206-123-45-61 |
| 1234 | Tom | Brown | 66000 | 20 Jump Street, Portland, OR, 97000 | 207-123-45-67 |
| | | | | | 207-123-45-66 |
| 1235 | Robert | White | 44000 | | |

SQL LANGUAGE EXTENSIONS FOR MODIFYING COLLECTION-VALUED AND SCALAR VALUED COLUMNS IN A SINGLE STATEMENT

FIELD OF THE INVENTION

The present invention relates to database systems and, more particularly, to a system and method for using nested relational SQL language extensions to modify tables with a hierarchical structure (such as nested tables and tables that store complex-structured objects or XML) in arbitrary ways in one step and for providing the mechanisms (such as change descriptor and leveraging of query optimization and query execution techniques) to achieve complex and partial updates efficiently.

BACKGROUND OF THE INVENTION

The SQL query language provides a user with the ability to query (and modify) tabular data stored using the relational data model. The relational data model dictates that each cell in a table (a column of a row) is a single scalar (or atomic) value. The structured query language (SQL) is an American National Standards Institute (ANSI) standard used to communicate with a relational database. SQL statements are used to perform tasks such as update data or retrieve data from a relational database. Although many database systems use SQL, many of them also have their own additional proprietary extensions that are usually only used on their system. However, the standard SQL commands such as "Select", "Insert", "Update", "Delete", "Create", and "Drop" can be used to accomplish many things that one desires to do with a relational database and are believed to be well known to those skilled in the database art.

Recent extensions to the relational data model relax the restriction of storing a single scalar value in a cell and allow each cell in a table to be a collection of values itself. Each element inside this collection can in turn contain a collection itself, i.e. the collection can be nested to arbitrary levels of depth. Tables with such collection-valued cells with multiple values can be broadly called nested tables. This development presents the problem of how to extend the SQL language to modify the collection values in such a nested table. For example, a technique for modifying the collection-valued cells to permit the simultaneous change of scalar values at any nesting level is desired.

Current implementations of nested tables and associated standards offer extensions for querying and updating collections in a nested table. In a conventional nested table system, however, the nested scalar values are updated one level at a time for each level of scalar values in a collection-valued cell, thus requiring multiple updates to change the stored values in a multi-level cell. For example, U.S. Pat. No. 6,564,203 describes techniques for updating data that logically resides in one or more nested collections in a nested collection column. A Data Manipulation Language (DML) statement that operates on one or more of the nested collections is detected and trigger code is executed once for each individual element within the nested collections targeted by the DML statement. The trigger code may include references to parent values; however, the triggers are designed to fire when a row of a database table or a table view is updated, inserted or deleted. In other words, only a single row is updated at a time. This process is slow and tedious and does not permit updates at any designated nested level.

U.S. Pat. No. 6,493,708 discloses a mechanism for defining a hierarchical dimension, the various levels thereof, and the relationships among the levels using a CREATE DIMENSION statement that includes various LEVEL statements to identify the levels of the hierarchy. A dimension table embeds the hierarchical relationships between granules in various levels of the dimension, assuming that the levels go from a finer to a coarser level. However, no general mechanism is taught for updating nested tables for values in respective rows that are not necessarily related to each other as finer/coarser representations of the same data.

The SQL 2003 standard specifies two kinds of collections—arrays and multisets. Columns of a table can be one of these two types. In existing database systems that implement arrays and multisets, the standard specifies syntax and semantics for modifying the collection-valued column in its entirety where the old value is replaced by an entirely new value. The prior art does not specify any way to modify the collection-valued column incrementally. A technique is desired that permits one to perform incremental modifications to such collections since it can be very expensive to replace an entire large collection with a new collection while the need is to only modify a small portion of it. The present invention addresses these needs in the art.

SUMMARY OF THE INVENTION

The present invention meets the above-mentioned needs in the art by providing a new way to update collection-valued columns in a nested table using a nested extension of the SQL UPDATE statement. The proposed extension uses syntax and semantics to modify collection-valued columns that is analogous to the syntax and semantics of the conventional UPDATE statement that is used to modify scalar-valued columns of the table (called the outer UPDATE). This is desirable since using the same syntactic and semantic constructs as the table at the outer level allows an existing implementation that processes modifications to relational tables to reuse its implementation techniques for processing updates to modify collection-valued columns as well. Also, such UPDATE extensions in accordance with the invention enable the specification of updates to nested collections embedded at arbitrary levels of depth in the hierarchy.

The new syntax is embedded inside the outer UPDATE statement in a way that parallels the structure of the data itself. The syntax thus maps more directly to the user's conceptual model of the data and is hence easier to understand. The proposed extension to the UPDATE statement allows updates to both the collection-valued columns and to other scalar-valued columns simultaneously using the same statement which allows for efficient processing of the modification.

A relational database system that implements UPDATE statements using change descriptors in accordance with the invention includes a parser that parses a database modification (query) statement and produces a logical description of changes to the table as specified by the UPDATE statement, a query optimizer that produces the execution algorithm that will perform the modifications, and finally a query execution engine that implements the execution algorithm. The execution algorithm consists of the following steps: (i) determine the rows in the complex structured type column (e.g., nested table) that need to be updated and calculate the new values for the columns in the complex structured type column to be updated, and (ii) apply the calculated new values to the complex structured type column. For modifications to collection-valued columns, step (ii) uses a data structure (change descriptor) that represents an aggregation of changes to the values in the collection-valued column and the location of the values to be updated in the hierarchy of the complex structured type column. In step (ii), the query execution engine reads the change descriptor and applies the changes as described by it to the collection-valued columns in addition to using simple scalar updates for the scalar valued columns.

The method for implementing the UPDATE extensions uses a technique, called the change descriptor, which is a data structure that aggregates all changes, both scalar and collection-valued, into a single value that provides a complete description of the changes to be made in a collection-valued column. The change descriptor tells the query execution engine what to change and where and is packaged as a conventional scalar but with all the hierarchical information needed to modify the scalars in the designated hierarchical levels. The change descriptor thus enables the efficient application of multiple updates at various granularity levels in a single operation. The change descriptor also enables the implementation of efficient index maintenance algorithms by updating only the indexes affected by the specific scalar fields modified at various nesting levels by the SET clause in the UPDATE operation and also updating only those rows of the index that correspond to the actual elements that got modified by the UPDATE operation. The change descriptor also has the benefit of separating the computation of the changes from their application itself (known as Halloween Protection), i.e. to prevent the update statement from side effecting itself. This could happen if the computation and the application of the changes were not strongly separated, because the first phase could be improperly affected, as a result of seeing the intermediate changes to the data the second phase might have produced.

The invention thus enables the use of nested relational SQL language extensions to modify tables with a hierarchical structure (such as nested tables and tables that store complex structured objects or XML) in arbitrary ways in one step and provides the mechanisms (change descriptor, leveraging of query optimization and query execution techniques) to achieve complex and partial updates efficiently. The SQL language extensions of the invention also enable rich and efficient support for managing and querying complex structured type relational or XML data in a database adapted to implement the invention.

BRIEF DESCRIPTION OF THE DRAWINGS

The foregoing summary, as well as the following detailed description of the invention, is better understood when read in conjunction with the appended drawings. For the purpose of illustrating the invention, the drawings include exemplary embodiments of various aspects of the invention; however, those skilled in the art will appreciate that the invention is not limited to the specific methods and instrumentalities disclosed. In the drawings.

DETAILED DESCRIPTION OF THE INVENTION

The subject matter of the present invention is described with specificity to meet statutory requirements (35 U.S.C. 1 et seq.). However, the description itself is not intended to limit the scope of the invention. Rather, the inventors have contemplated that the claimed subject matter might also be embodied in other ways to include different steps or elements similar to the ones described herein as may be used in conjunction with other present or future technologies during the lifetime of this patent. Moreover, although the term "step" may be used herein to connote different aspects of methods employed, this term should not be interpreted as implying any particular order among or between various steps herein disclosed unless and except when a specific order of individual steps is explicitly described as being necessary.

Those skilled in the database and memory management arts will appreciate that the present invention will be useful to any extended relational database system that supports nested tables, such as MYSQL. Accordingly, the present invention described herein with respect to FIGS. 1-6 is to be understood to be applicable to all such systems.

Definitions:

Complex Structured Type: A complex structured type consists of a set of fields, properties and methods. Each field or property can be one of:

a scalar type;

a complex structured type itself;

a multiset in which each element is a complex structured type.

Complex structured types are restricted to be non-recursive. In other words, a complex structured type cannot include a property of field of that same type. A complex structured type as defined herein includes nested tables, collection-valued tables, and other multi-dimensional data structures.

Multisets: A multiset is a type of collection. It is a set of unordered objects with possible duplicates. The multiset is strongly typed in the sense that it defines the type of the elements it contains. This document will use the notation Multiset<T> to denote a multiset of elements of type T.

In both complex structured types and multiset-valued types, it is possible to have arbitrarily deep levels of nesting.

A complex structured type may be represented canonically with the following syntax. In this example, the AddressType has a field called PhoneNos which is collection-valued and is typed Multiset<PhoneNoType>:

```
class    AddressType {
         SqlString    Street,
         SqlString    City,
         SqlString    Country,
         Multiset<PhoneNoType> PhoneNos
}
``` where PhoneNoType is defined as

```
class PhoneNoType {
    SqlString   AreaCode,
    SqlString   Number,
    SqlString   Extension
}
```

The following tables use the types defined above. First a MULTISET type is created for a Multiset of AddressType. Then that type is used to define a column of the Employees table:

```
CREATE TYPE AddressesType AS MULTISET(AddressType)
CREATE TABLE Employees (
    EmpID       int,
    FirstName   varchar(30),
    LastName    varchar(30),
    Salary      int,
    Addresses   AddressesType
)
```

Embodiments of Invention

The present invention provides a technique for providing data modification capabilities for tables with complex structures (i.e., tables that contain both structured columns and multiset-valued columns). In a preferred embodiment of the invention, these features are part of a SQL Server engine for updating data stored in a relational database. For example, the present invention is efficiently used in conjunction with applications that often have a data model that is more complex than a 1NF (or "flat") relational model. The data types that they model have complex internal structure and/or include multisets of values. Typically, such applications model this data using a set of flat tables. Complex structured types and multisets provide a way to model such data whose logical schema maps more naturally to the original data model. The present invention may be used to update relational data in multisets that are embedded inside such a complex structured type. As will be explained in more detail below, the invention also includes the ability to modify multiset data with the level of richness and expressive power that SQL provides at the outer most level on flat tables.

In accordance with the invention, an SQL statement is being enhanced to support modifications to collection-valued columns (multisets) of a table. The SQL statement that is being enhanced to support modifications to collection-valued columns of a table in accordance with the invention is the UPDATE statement. The general format of the conventional UPDATE statement is as follows, where syntax elements surrounded by <> are non-terminals that are expanded later in the description:

```
UPDATE <target-table>
SET <scalar-column-modification1>, <scalar-column-modification>, ....
    ...
WHERE <search-condition>
``` where <target-table> is the table being modified, <scalar-column-modification> specifies the modification of a scalar-valued column and is of the following form:

<target-column1>=<value-expression> where <target-column> is the name of the column being modified and <value-expression> is a scalar valued expression that supplies the new value to which <target-column> should be modified.

The proposed extension of the UPDATE statement in accordance with the invention introduces another kind of modification (<collection-column-modification>) in the SET clause that can be used to modify collection-valued columns. A <collection-column-modification> is one of the following forms:

```
        (UPDATE <collection-valued-column>
        SET ...
        WHERE <search-condition>)
    Or
        (DELETE FROM <collection-valued-column>
        WHERE ...)
    Or
        (INSERT INTO <collection-valued-column>
        VALUES (...)
        )
```

In other words, the <collection-column-modification> uses INSERT/UPDATE/DELETE syntax that is similar to INSERT/UPDATE/DELETE against the outer-table. The SET clause of the inner UPDATE can in turn specify modifications to collection-valued columns inside the outer collection-valued column, and thus enables modifications to collection-valued columns in any level of nesting using the same recursively nested syntactic approach. In essence, modifications on collection-valued columns are modeled as UPDATEs on the outer table by embedding the INSERT/UPDATE/DELETE in the SET clause of the outer UPDATE statement.

As noted above, the data structure that aggregates all changes, both scalar and collection-valued, into a single value that provides a complete description of the changes to be made in a complex-structured, object-valued or collection-valued column in accordance with the invention is referred to herein as a "change descriptor." The change descriptor tells the UPDATE instruction what to change and where in the complex structured type hierarchy and is packaged as a conventional scalar so as to permit the UPDATE instruction to update scalars in the designated hierarchical levels. The change descriptor enables the implementation of efficient index maintenance algorithms by updating only the indexes affected by scalar or collection-valued fields affected by the set clause in the UPDATE operation and also updating only those rows of the index that correspond to the actual elements of the collection that got modified by the UPDATE operation. The present invention thus uses a change descriptor to implement complex and partial updates to table columns that are not scalar, but rather have a hierarchical structure.

Examples of the implementation of the change descriptor will be provided below with respect to updates to an Employees table, with the scalar-valued columns: FirstName, LastName and EmployeeID, Salary and a collection-valued column called Addresses which stores a set of addresses. Each address in the collection-valued column has the following scalar-valued columns: Street, City, State, ZipCode and a collection-valued column called PhoneNos. For example:

```
Employees
    EmployeeID
    FirstName
    LastName
    Salary
    Addresses
        Street
        City
        State
        ZipCode
        PhoneNos
            AreaCode
            Number
            Extension
```

The syntax of conventional UPDATE statements only allows modifying table columns as a whole, by assigning them to their new value. As an example, if employees 1234 and 1235 in the table "Employees" are to be given a 10% salary raise, then this operation can be implemented with the following conventional syntax:

```
UPDATE Employees
SET Salary = Salary * 1.1
WHERE EmpID = 1234 OR EmpID = 1235
```

Such UPDATEs are processed using two phases. During the first phase, the rows to be changed are enumerated and the new values for the columns to be modified are calculated. This process produces a stream of data representing the changes to be performed, called herein a delta stream. In the second phase, the columns are modified as per this delta stream.

Figure 1:
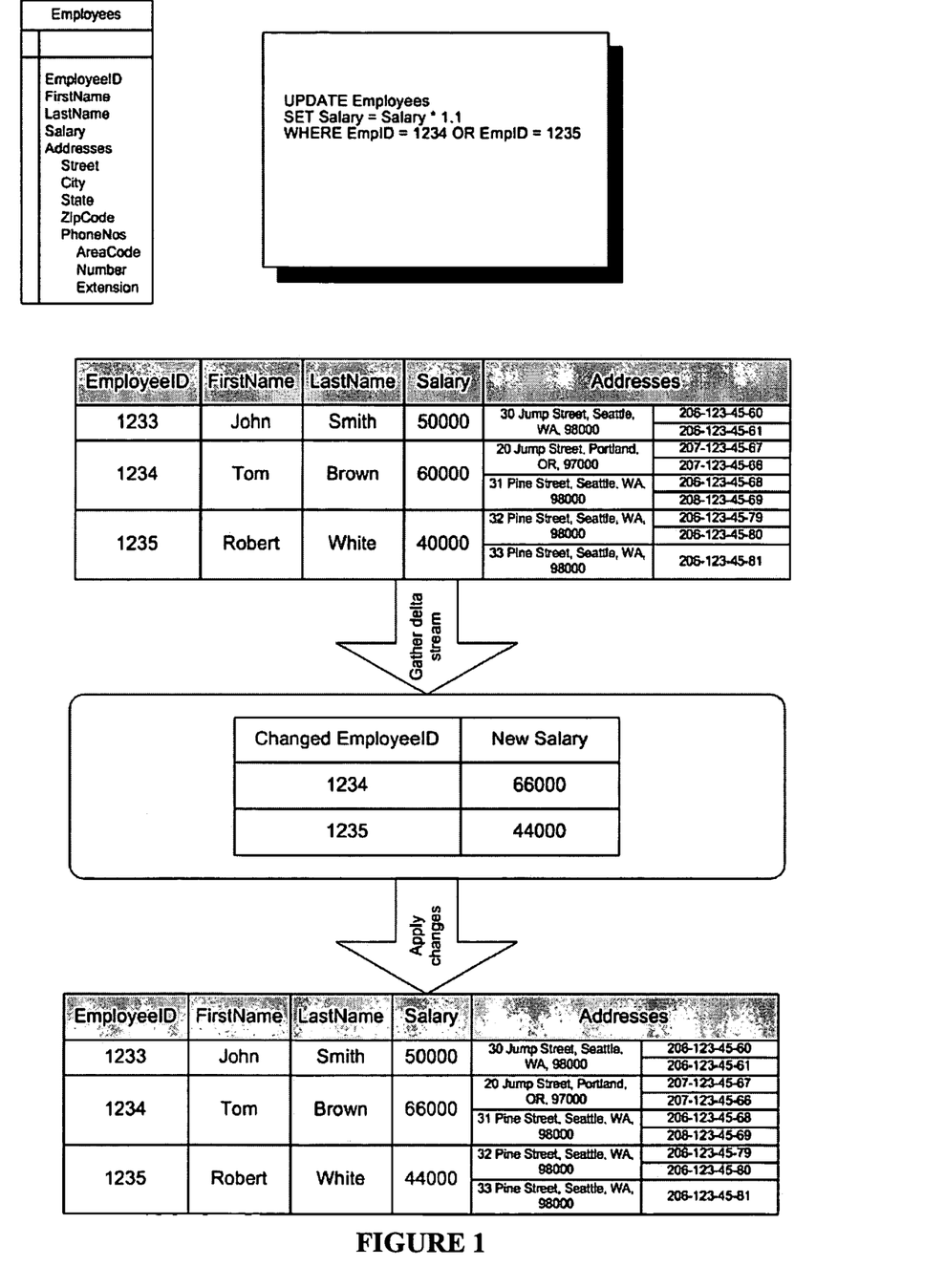
FIG. 1 illustrates a nested table update of the Salary scalar which is implemented by enumerating the rows that satisfy the predicate in the query and calculating the new value of the Salary column for each row.

In accordance with the invention, on the other hand, UPDATE statements modify parts of a complex-structured collection-valued column using a variation of the same mechanism using two phases. In the first phase, in accordance with the invention, the delta stream uses a new data structure that aggregates all the changes to the collection valued column. As illustrated in FIG. 1, the first phase of the update will be implemented by enumerating the rows that satisfy the predicate in the query and calculating the new value of the Salary column for each of them. This will produce the delta stream for the update. The second phase includes the step of applying the delta stream to the table itself, so as to perform the previously gathered changes.

As described herein, the change descriptor technique is a way to implement fine-grained, rather than full, changes to complex-structured or collection-valued columns, extending the concept of delta stream mentioned above. The set of changes to be applied to a collection-valued column as part of a nested update can be seen as a delta stream in itself. This delta stream is nested inside the top-most delta stream representing the changes to the table. Changes to collection-valued columns contained inside a collection-valued column again can be represented with a further nested delta stream.

The change descriptor is a compact and scalar representation of the nested delta streams. Representing it as a scalar value allows it to be seamlessly gathered together with the other new values of regular table columns during the generation of the top-most, table level delta stream. This allows scalar and multi-level nested updates to be mixed together in the same statement.

The implementation of the second phase of the update understands that the change descriptor does not contain the full new value of the collection-valued columns, but rather only the set of fine-grained changes to be applied. The implementation is also aware of the storage format of the collection-valued column, and is able to translate the information contained inside the change descriptor into physical operations. Hence, the change descriptor format is rather flexible and not too implementation dependent, and can be used with a variety of other kinds of complex structures such as XML, object types in addition to collection-valued columns.

Figure 2:
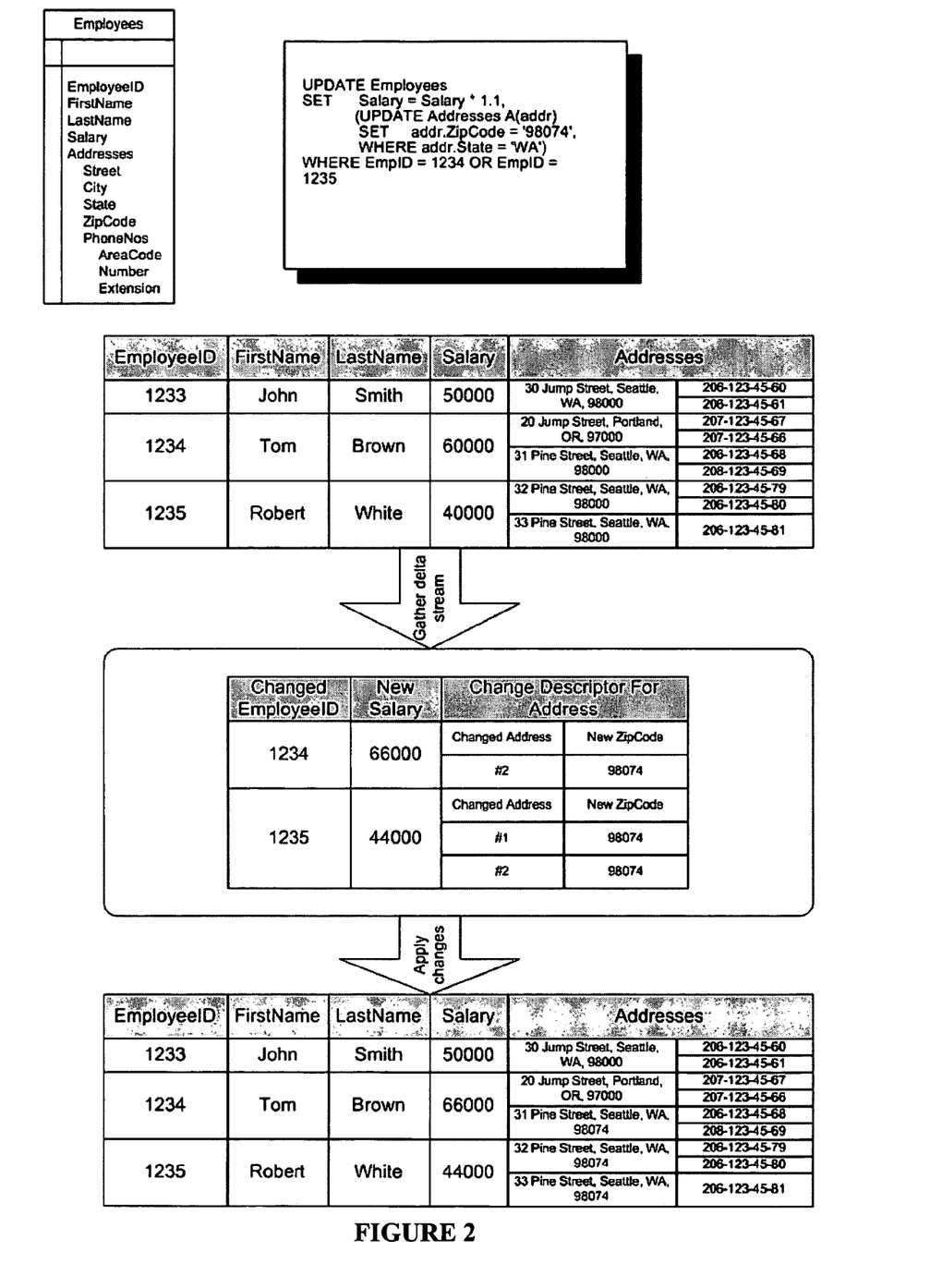
FIGS. 2-4 illustrate three examples of nested UPDATE statements in accordance with the invention including diagrams outlining the change descriptor content and the effects of its application.
Figure 3:
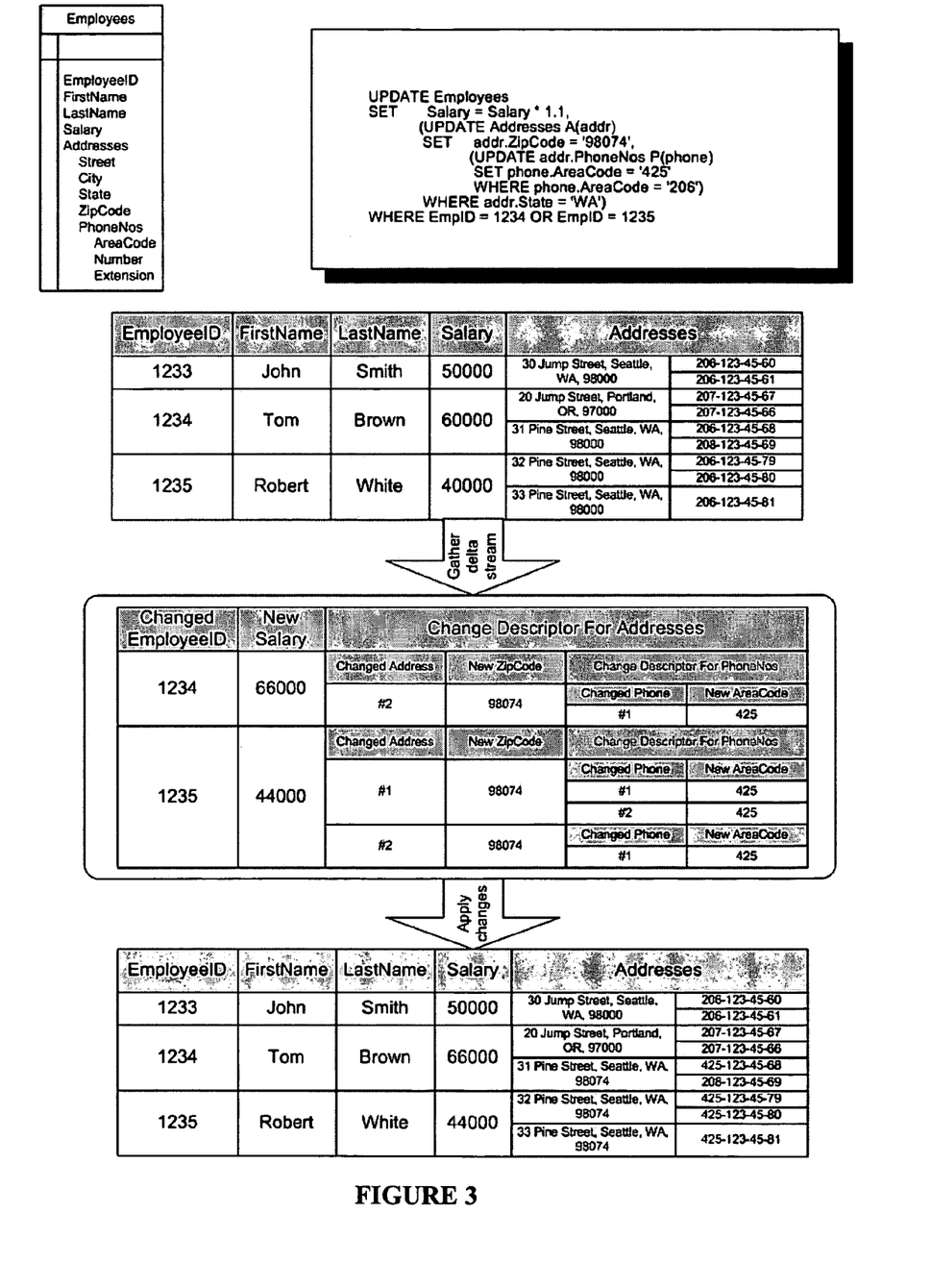
Figure 4:
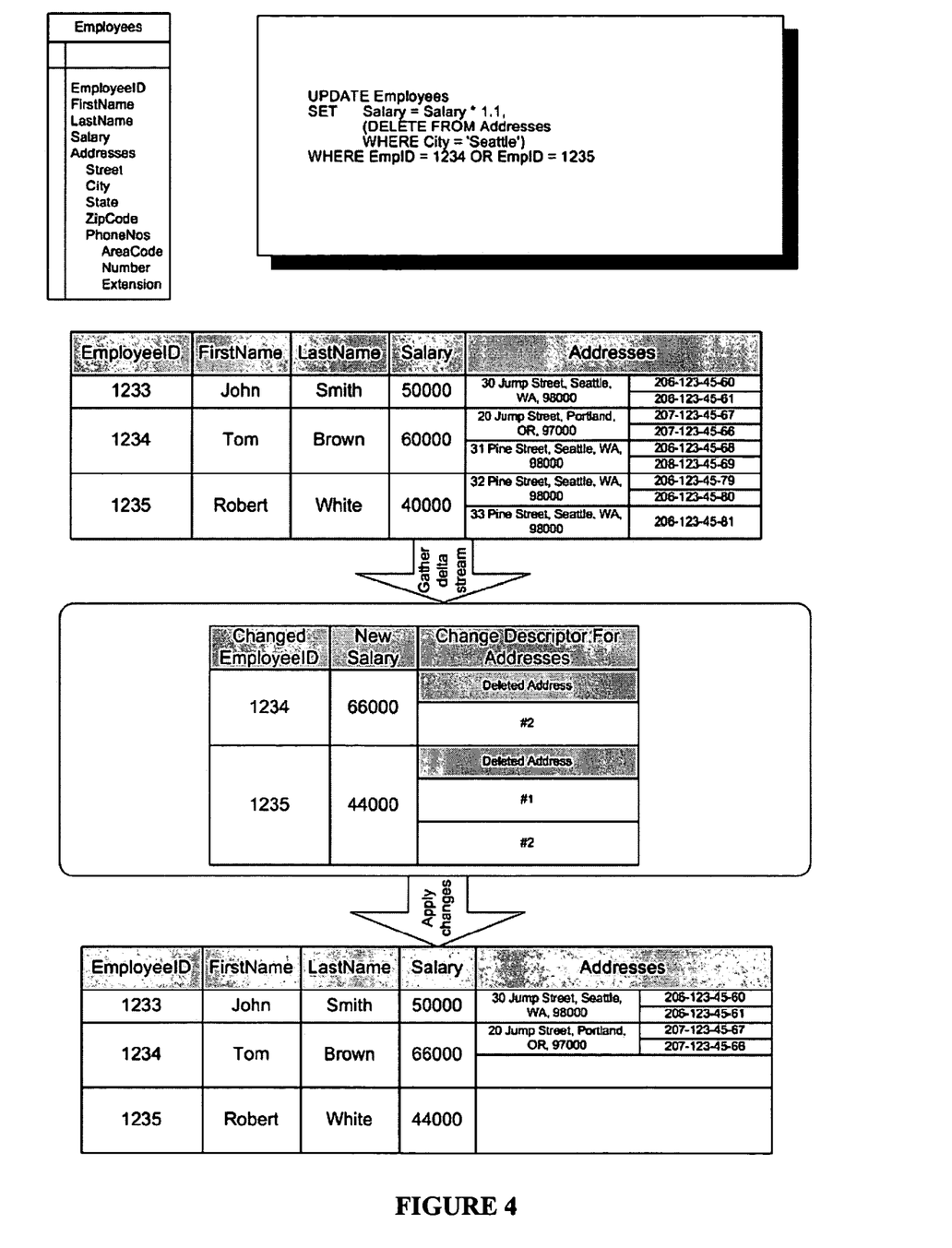

FIGS. 2-4 illustrate three examples of nested update statements, and the corresponding diagrams outlining the change descriptor content and the effects of its application. The first statement (FIG. 2) will change the records for the two employees, at the same time giving the 10% raise and updating the ZipCode for addresses in Washington State.

```
UPDATE Employees
SET  Salary = Salary  1.1,
     (UPDATE Addresses A(addr)
      SET  addr.ZipCode = '98074',
      WHERE addr.State = 'WA')
WHERE EmpID = 1234 OR EmpID = 1235
```

The second statement (FIG. 3) is similar, but it also updates the AreaCode field inside some of phones contained inside the addresses being updated. This shows the ability to modify scalar values in 3 levels of the hierarchy in the same statement (Salary in level 1, Zipcode in level 2 and AreaCode in level 3).

```
UPDATE Employees
SET  Salary = Salary * 1.1,
     (UPDATE Addresses A(addr)
      SET  addr.ZipCode = '98074',
           (UPDATE addr.PhoneNos P(phone)
            SET phone.AreaCode = '425'
            WHERE phone.AreaCode = '206')
      WHERE addr.State = 'WA')
WHERE EmpID = 1234 OR EmpID = 1235
```

In the third example (FIG. 4), together with the raise, the two employees have their addresses in Seattle removed.

```
UPDATE Employees
SET  Salary = Salary * 1.1,
     (DELETE FROM Addresses
      WHERE City = 'Seattle')
WHERE EmpID = 1234 OR EmpID = 1235
```

Code Implementation of Change Descriptors

The code for implementing the change descriptors in accordance with the invention operates to build the change descriptors and to consume the change descriptors. The change descriptors are built from the bottom up in the hierarchy, and operators receiving the change descriptors break them down in accordance with the syntax set forth in detail above. The syntax specifies the update location in the hierarchical nested table structure and maintains a hierarchical record of the multi-valued stored data. Since the change descriptor embodies location information as well as scalar information, hierarchical data within a cell may be updated using a single step in the query execution algorithm as in the examples above.

Figure 5:
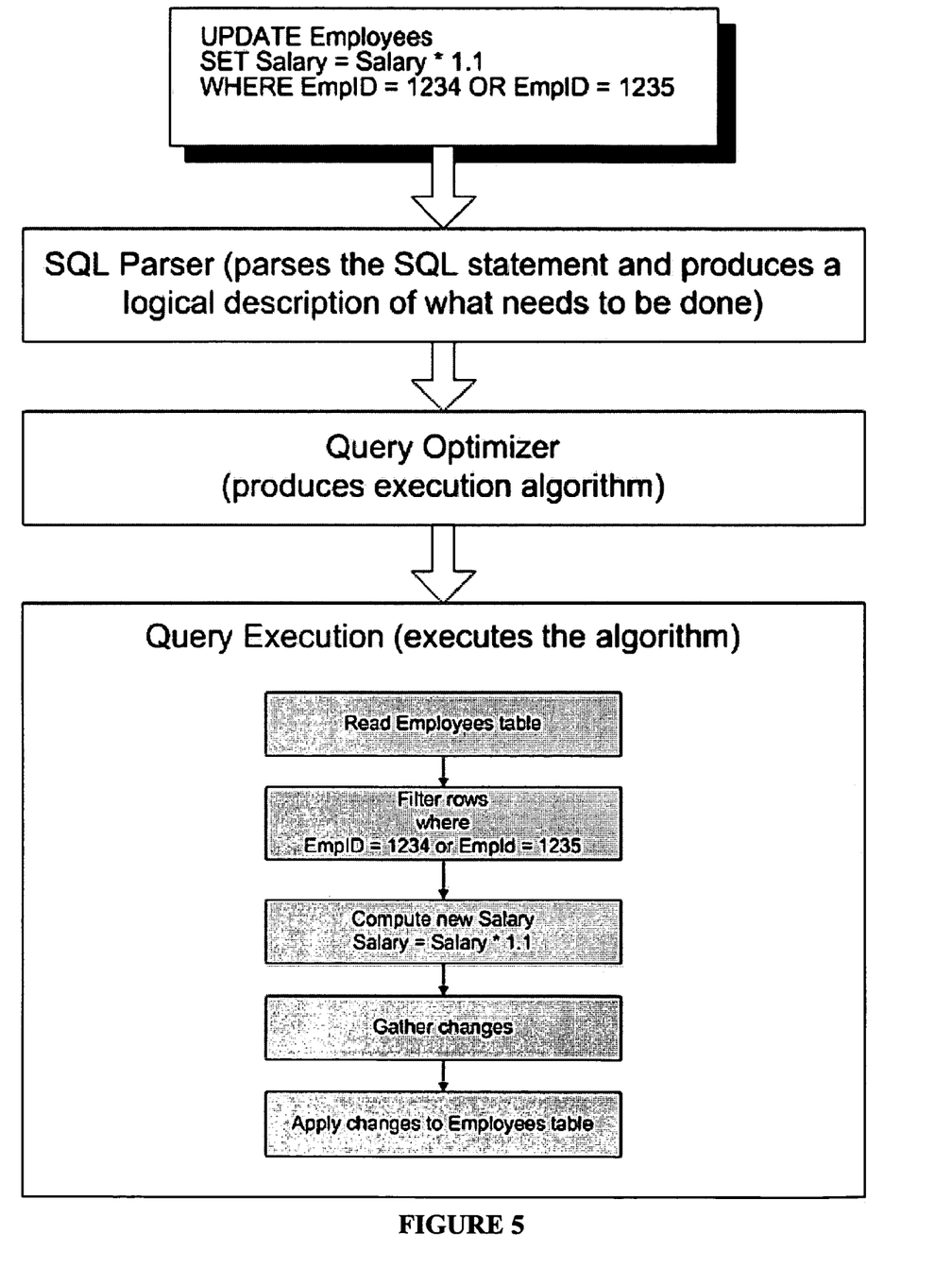
FIG. 5 illustrates the steps of parsing, optimizing and executing a regular update of a table using a conventional UPDATE instruction in a conventional SQL Server system.
Figure 6:
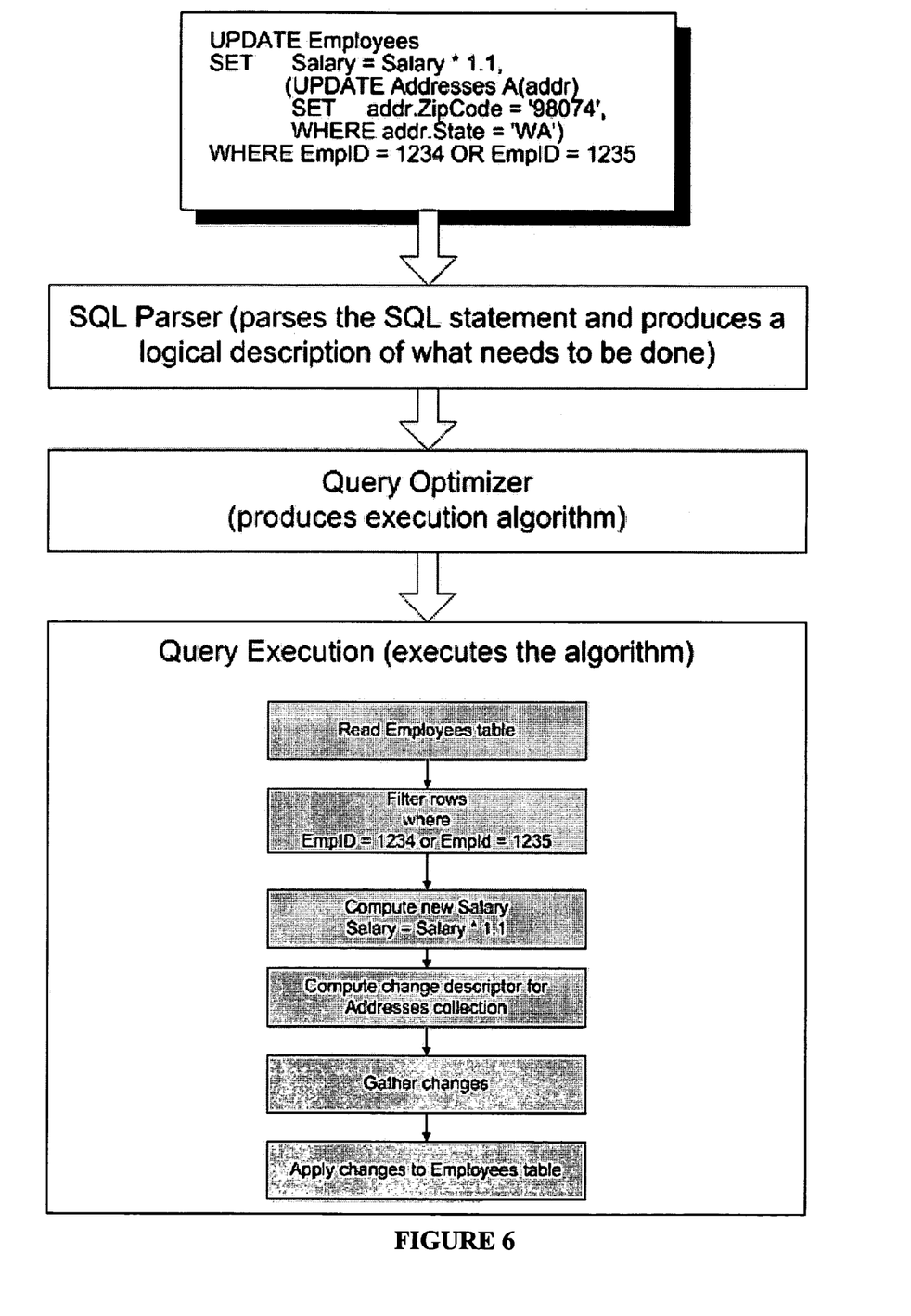
FIG. 6 illustrates the nested update case of the invention whereby the query execution process is modified to compute the change descriptor in accordance with the invention.

FIGS. 5 and 6 illustrate the implementation of the change descriptors of the invention in the examples of FIGS. 2-4 above. FIG. 5 illustrates the steps of parsing, optimizing and executing a regular update of a cell using a conventional UPDATE instruction in a conventional SQL Server system. FIG. 6 illustrates the nested update case of the invention whereby the query execution process is modified to compute the change descriptor in accordance with the syntax above. As illustrated, the relational database system includes a SQL parser that parses the received SQL statement and produces a logical description of what the user requires to be done by the database (e.g., insert, update, or delete data) and a query optimizer that produces an execution algorithm using techniques known in the art. In accordance with the invention, the conventional query execution of FIG. 5 is modified to further include the step of computing the change descriptor for making each of the changes in the nested tables set forth in the change descriptor. Further, the query execution engine in accordance with the invention is enhanced to read the change descriptor and apply the changes as described by the change descriptor to the table. In the example of FIG. 6, the Addresses are updated in addition to the salary. Once the changes are gathered, they are applied to the Employees table in the database (not shown) that is associated with the SQL Server system of the invention.

Those skilled in the art will appreciate from FIG. 6 that the change descriptor of the invention enables the implementation of efficient index maintenance algorithms by updating only the indexes affected by the specific scalar fields modified at various nesting levels by the SET clause in the UPDATE operation and also updating only those rows of the index that correspond to the actual elements that got modified by the UPDATE operation. The change descriptor also has the benefit of separating the computation of the changes from their application (known as Halloween Protection), i.e. to prevent the update statement from side effecting itself. This could happen if the computation and the application of the changes were not strongly separated in two separate steps, because the first phase could be improperly affected, as a result of seeing the intermediate changes to the data the second phase might have produced.

Those skilled in the art will also appreciate that the present invention is particularly advantageous for storing large data types as fields of a user defined type within a database management system. It is understood that changes may be made to the embodiments described above without departing from the broad inventive concepts thereof. For example, while an embodiment of the present invention has been described above in the context of Microsoft's SQL SERVER database management system, it is understood that the present invention may be embodied in any database management system (e.g., object oriented database, XML database, etc.) that supports the use of SQL UPDATE statements. Additionally, while certain aspects of the present invention have been described as being embodied in the context of a relational database system such as SQL Server, it is understood that those aspects of the present invention are by no means necessarily limited to implementation in that environment. Accordingly, it is understood that the present invention is not limited to the particular embodiments disclosed, but is intended to cover all modifications that are within the spirit and scope of the invention as defined by the appended claims.

What is claimed is:

1. A computer implemented method of updating values in a complex structured type column in a relational database system, the method comprising:

representing modifications to a subset of a plurality of values in the complex structured type column using a data structure, wherein the plurality of values in the complex structured type column are embedded in a hierarchy having a plurality of levels within at least one row of the complex structured type column, wherein the subset of the plurality of values are embedded at arbitrary levels within the hierarchy;

aggregating changes to the subset of the plurality values at the arbitrary levels in the complex structured type column;

computing the data structure in response to a data modification statement on the database to determine the subset of the plurality values within the complex structured type column to update with the aggregated changes; and applying the aggregated changes to the subset of the plurality of values in the complex structured type column.

2. The method of claim 1, further comprising simultaneously updating the subset of the plurality of values with the aggregated changes, wherein the subset of the plurality of values comprises multiple scalar values at different levels within the hierarchy of the complex structured type column.

3. The method of claim 1, further comprising simultaneously updating the subset of the plurality of values with the aggregated changes, wherein the subset of the plurality of values comprises a scalar value in a table and a complex structured type value in the complex structured type column of said relational database system.

4. The method of claim 1, further comprising embedding an INSERT/UPDATE/DELETE statement inside a SET clause of an UPDATE statement.

5. The method of claim 4, further comprising embedding a plurality of nested SET clauses inside an outer-most UPDATE statement corresponding to each of the plurality of levels within the hierarchy of the complex structured type column.

6. The method of claim 4, wherein computing the data structure comprises updating only indexes affected by specific scalar fields modified at various nesting levels by the SET clause in the UPDATE statement and updating only those rows of the index that correspond to the actual values that are modified by the UPDATE statement.

7. The method of claim 1, further comprising providing Halloween Protection by computing the data structure and applying the aggregated changes separately.

8. A relational database system responsive to database modification statements to store and update values in at least one complex structured type column, the relational database system comprising:

a parser that parses a database modification statement and produces a description of changes to a subset of a plurality of values in a complex structured type column proposed by the database modification statement, wherein the plurality of values in the complex structured type column are embedded in a hierarchy having a plurality of levels within at least one row of the complex structured type column, and wherein the subset of the plurality of values are embedded at arbitrary levels within the hierarchy;

a query optimizer that produces an execution algorithm to implement the database modification statement; and a query execution engine that uses the execution algorithm to compute a data structure of the database modification statement to determine the subset of the plurality of values within the complex structured type column to be updated, wherein the data structure represents the subset of the plurality of values in the complex structured type column as an aggregation of changes to the subset of the plurality of values at the arbitrary levels of the hierarchy of the complex structured type column, and wherein the query execution engine applies the changes to the subset of the plurality of values in the complex structured type column that are to be updated.

9. The system of claim 8, wherein the query execution engine simultaneously updates the subset of the plurality of values with the aggregated changes, wherein the subset of the plurality of values comprises multiple scalar values at different levels within the hierarchy of the complex structured type column.

10. The system of claim 8, wherein the query execution engine simultaneously updates the subset of the plurality of values with the aggregated changes, wherein the subset of the plurality of values comprises a scalar value in a table and a complex structured type value in the complex structured type column of said relational database system.

11. The system of claim 8, wherein the parser parses a SET clause of an UPDATE statement.

12. The system of claim 11, wherein the parser parses the UPDATE statement in a plurality of nested SET clauses inside an outermost UPDATE statement corresponding to each of the plurality of levels within the hierarchy of the complex structured type column.

13. The system of claim 11, wherein the query execution engine updates only indexes affected by specific scalar fields modified at various nesting levels by the SET clause in the UPDATE statement and updates only those rows of the index that correspond to the actual values that are modified by the UPDATE statement.

14. The system of claim 8, wherein the query execution engine provides Halloween Protection by computing the data structure and applying the aggregated changes separately.

15. A computer implemented method of updating values in a collection-valued column in a relational database system, the method comprising:
representing modifications to a subset of a plurality of values in the collection-valued column using a data structure, wherein the plurality of values in the collection-valued column are embedded in a hierarchy having a plurality of levels within at least one row of the collection-valued column, wherein the subset of the plurality of values are embedded at arbitrary levels within the hierarchy, and wherein the data structure aggregates changes to the subset of the plurality of values at the arbitrary levels inside the collection-valued column;
computing the data structure in response to a data modification statement on the database to determine the subset of the plurality of values within the collection-valued column to update with the aggregated changes; and
applying the aggregated changes to the subset of the plurality of values in the collection-valued column.

16. The method of claim 15, further comprising simultaneously updating the subset of the plurality of values with the aggregated changes, wherein the subset of the plurality of values comprises multiple scalar values at different levels within the collection-valued column.

17. The method of claim 15, further comprising simultaneously updating the subset of the plurality of values with the aggregated changes, wherein the subset of the plurality of values comprises a scalar value in a table and a value in the collection-valued column of said relational database system.

18. A relational database system responsive to database modification statements to store and update values in at least one collection-valued column, the relational database system comprising:
a parser that parses a database modification statement and produces a description of changes to a subset of a plurality of values in a collection-valued column proposed by the database modification statement, wherein the plurality of values in the collection-valued column are embedded in a hierarchy having a plurality of levels within at least one row of the collection-valued column, and wherein the subset of the plurality of values are embedded at arbitrary levels within the hierarchy;
a query optimizer that produces an execution algorithm to implement the database modification statement; and
a query execution engine that uses the execution algorithm to compute a data structure of the database modification statement to determine the subset of the plurality of values within the collection-valued column to be updated, wherein the data structure represents the subset of the plurality of values in the collection-valued column as an aggregation of changes to the subset of the plurality of values at the arbitrary levels inside the collection-valued column, and wherein the query execution engine applies the changes to the subset of the plurality of values in the collection-valued column that are to be updated.

19. The system of claim 18, wherein the parser parses a SET clause of an UPDATE statement.

20. The system of claim 19, wherein the parser parses the UPDATE statement in a plurality of nested SET clauses inside an outermost UPDATE statement corresponding to each of the plurality of levels within the collection-valued column.

21. The system of claim 18, wherein the query execution engine updates only indexes affected by specific scalar fields modified at various nesting levels by the SET clause in the UPDATE statement and updates only those rows of the index that correspond to the actual values that are modified by the UPDATE statement.

22. The system of claim 18, wherein the query execution engine applies provides Halloween Protection by computing the data structure and applying the aggregated changes separately.

* * * * *